US009816272B2

(12) United States Patent
Powers, III

(10) Patent No.: US 9,816,272 B2
(45) Date of Patent: Nov. 14, 2017

(54) PURLIN CONSTRUCTION AND MOUNTING SYSTEM FOR FLAT ROOF STRUCTURES

(71) Applicant: John Powers, III, Phoenix, AZ (US)

(72) Inventor: John Powers, III, Phoenix, AZ (US)

( * ) Notice: Subject to any disclaimer, the term of this patent is extended or adjusted under 35 U.S.C. 154(b) by 0 days.

(21) Appl. No.: 15/341,327

(22) Filed: Nov. 2, 2016

(65) Prior Publication Data

US 2017/0073967 A1 Mar. 16, 2017

Related U.S. Application Data

(62) Division of application No. 14/518,169, filed on Oct. 20, 2014, now Pat. No. 9,512,617.

(51) Int. Cl.
*E04C 3/07* (2006.01)
*E04B 7/02* (2006.01)
(Continued)

(52) U.S. Cl.
CPC ............... *E04B 7/024* (2013.01); *E04C 3/02* (2013.01); *E04C 3/06* (2013.01); *E04C 3/07* (2013.01); *E04D 12/004* (2013.01); *E04D 13/1612* (2013.01); *F24J 2/526* (2013.01); *F24J 2/5207* (2013.01); *F24J 2/5232* (2013.01); *E04B 1/3416* (2013.01); *E04C 2003/046* (2013.01); *E04C 2003/0408* (2013.01); *E04C 2003/0421* (2013.01); *E04C 2003/0439* (2013.01); *E04C 2003/0452* (2013.01); *Y02B 10/20* (2013.01); *Y02E 10/47* (2013.01)

(58) Field of Classification Search
CPC ............... E04C 3/07; E04C 2003/0421; E04C 2003/0434; E04C 2003/0413; E04C 2003/0452; E04C 2003/0473; E04C 2003/0439
See application file for complete search history.

(56) References Cited

U.S. PATENT DOCUMENTS 3,043,408 A * 7/1962 Attwood .................. E04C 3/07
 104/107
3,217,460 A * 11/1965 Downing, Jr. ........ E04B 2/7854
 52/481.1
(Continued)

FOREIGN PATENT DOCUMENTS

FR EP 0434559 * 12/1990

*Primary Examiner* — Rodney Mintz
*Assistant Examiner* — Daniel Kenny
(74) *Attorney, Agent, or Firm* — Parsons & Goltry; Robert A. Parsons; Michael W. Goltry

(57) ABSTRACT

A purlin mounting system for use in a flat roof structure includes a purlin with a flat mounting wall and an upright wall extending perpendicularly from the mounting wall. First and second mounting shelves are attached to the upright wall and extend outwardly in opposite directions. Each mounting wall is positioned to receive an edge of a roof section thereon. The flat mounting wall and the upright wall define a vertical mounting channel extending from a lower surface of the flat mounting wall a distance less than the distance of the first and second mounting shelves from the mounting wall. A purlin positioning and mounting device is designed to be attached to a roof beam and includes a vertically extending support wall designed to extend upwardly from a supporting roof beam when attached to the supporting roof beam and to nest within the mounting channel.

14 Claims, 4 Drawing Sheets

(51) Int. Cl.
*E04D 12/00* (2006.01)
*F24J 2/52* (2006.01)
*E04C 3/02* (2006.01)
*E04C 3/06* (2006.01)
*E04D 13/16* (2006.01)
E04C 3/04 (2006.01)
E04B 1/34 (2006.01)

(56) References Cited

U.S. PATENT DOCUMENTS

| | | | | |
|---|---|---|---|---|
| 3,778,020 | A * | 12/1973 | Burrows | E04G 17/12 249/219.1 |
| 4,408,423 | A * | 10/1983 | Lautensleger | E04B 7/024 52/90.1 |
| 8,857,133 | B2 * | 10/2014 | Powers, III | H02S 20/23 52/650.1 |
| 2012/0328898 | A1 * | 12/2012 | Strickland | B62D 21/02 428/594 |

* cited by examiner

PURLIN CONSTRUCTION AND MOUNTING SYSTEM FOR FLAT ROOF STRUCTURES

CROSS REFERENCE TO RELATED APPLICATIONS

This application claims the benefit of U.S. Non-Provisional Patent Application No. 14/518,169, filed Feb. 10, 2014.

FIELD OF THE INVENTION

This invention generally relates to purlin type supports and a system for mounting the purlins in flat roof structures. The invention further relates to flat roof sections and ceiling sections mounted on or forming the flat roof.

BACKGROUND OF THE INVENTION

At the present time, metal flat roof structures and/or solar panel mounts include purlins positioned in spaced apart relationship on perpendicular beams. The purlins are then mounted on the beams by means of bolts, screws, or other fastening devices. The problem that arises is that the process of positioning the purlins on the upper flat surface of the beams can be difficult and time consuming. Further, once correctly positioned the purlins must be manually held in place while they are being fixedly attached to the beams. In many instances this manual holding and attaching can require multiple workers.

It would be highly advantageous, therefore, to remedy the foregoing and other deficiencies inherent in the prior art.

Accordingly, it is an object of the present invention to provide a new and improved purlin for flat roof structures.

It is another object of the present invention to provide a new and improved purlin for flat roof structures including additional structure for easily and quickly attaching the purlins in the correct position.

It is another object of the present invention to provide a new and improved purlin for flat roof structures including additional structure for attaching ceiling sections.

It is another object of the present invention to provide a new and improved purlin for flat roof structures that can be easily positioned on the beams at the site.

It is another object of the present invention to provide a new and improved purlin for flat roof structures that are relatively simple and inexpensive to manufacture and install.

SUMMARY OF THE INVENTION

Briefly, to achieve the desired objects of the instant invention in accordance with a preferred embodiment thereof, a purlin is provided including a flat mounting wall and an upright wall extending perpendicularly from the mounting wall, first and second mounting shelves attached to the upright wall a distance from the upright wall and extending outwardly in opposite directions, each mounting wall being positioned to receive a lower surface adjacent an edge of a roof section thereon, the flat mounting wall and the upright wall defining a vertical mounting channel extending from a lower surface of flat mounting wall a distance less than the distance of the first and second mounting shelves from the mounting wall. Also provided is a purlin positioning and mounting device designed to be attached to a roof beam and including a vertically extending support wall designed to extend upwardly from a supporting roof beam when attached to the supporting roof beam and to nest within the mounting channel.

The desired objects of the instant invention are further achieved in accordance with a specific embodiment of a purlin mounting system for use in a flat roof structure that includes a purlin formed from a single metal strip with a plurality of longitudinal bends defining a first flat mounting wall portion, a first upright wall portion extending upwardly from an edge of the first flat mounting wall portion, a first perpendicularly outwardly extending mounting shelf attached to an upper end of the first upright wall portion, a second flat mounting wall portion, a second upright wall portion extending upwardly from an edge of the second flat mounting wall portion parallel to and in abutting engagement with the first upright wall portion, a second perpendicularly outwardly extending mounting shelf attached to an upper end of the second upright wall portion and extending in an opposed direction to the first perpendicularly outwardly extending mounting shelf, and a third upright wall portion extending from and perpendicular to the first mounting shelf and the second mounting shelf. The purlin is further formed so that the first flat mounting wall portion and the second flat mounting wall portion cooperate to form a flat mounting wall for mounting the purlin on a roof beam, the first upright wall portion and the second upright wall portion being spaced apart adjacent the first flat mounting wall portion and the second flat mounting wall portion defining a vertical mounting channel extending from a lower surface of the flat mounting wall a distance less than the distance of the first and second mounting shelves from the flat mounting wall.

The desired objects of the instant invention are further achieved in accordance with a method of fabricating a purlin for use in a flat roof structure including the steps of providing an elongated strip of sheet metal and forming the strip into a purlin by bending the strip along a longitudinal direction into a plurality of integral longitudinal elements including a first flat mounting wall portion, a first upright wall portion extending upwardly from an edge of the first flat mounting wall portion, a first perpendicularly outwardly extending mounting shelf attached to an upper end of the first upright wall portion, a second flat mounting wall portion, a second upright wall portion extending upwardly from an edge of the second flat mounting wall portion parallel to and in abutting engagement with the first upright wall portion, a second perpendicularly outwardly extending mounting shelf attached to an upper end of the second upright wall portion and extending in an opposed direction to the first perpendicularly outwardly extending mounting shelf, and a third upright wall portion extending from and perpendicular to the first mounting shelf and the second mounting shelf. The steps of forming the first flat mounting wall portion and the second flat mounting wall portion including positioning the first flat mounting wall portion and the second flat mounting wall portion to form a flat mounting wall for mounting the purlin on a roof beam. The steps of forming the first upright wall portion and the second upright wall portion including spacing the first upright wall portion and the second upright wall portion apart adjacent the first flat mounting wall portion and the second flat mounting wall portion to define a vertical mounting channel extending from a lower surface of the flat mounting wall a distance less than the distance of the first and second mounting shelves from the flat mounting wall.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF A PREFERRED EMBODIMENT

Figure 1:
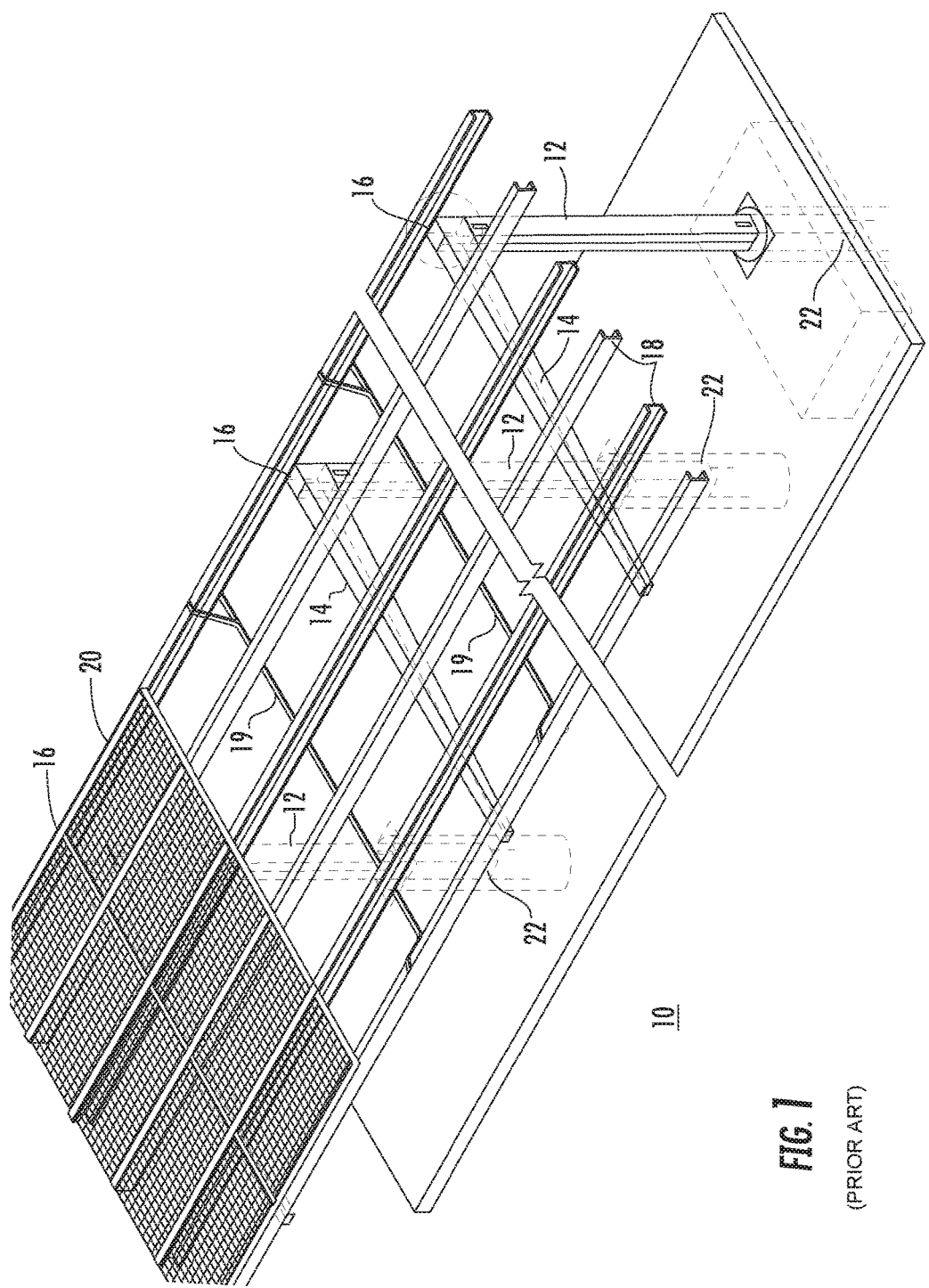
FIG. 1 is an isometric top view of a flat multi-column roof structure of the type anticipated for the present invention.

Turning now to FIG. 1, a flat, cantilevered multi-column structure 10 is illustrated. Structure 10 includes a plurality of vertical columns or posts 12 each with a cantilever beam 14 attached to an upper end 16. While cantilevered beams are illustrated in this example, it will be understood that the present invention can be used with virtually any type of beams upon which purlins are or can be attached. A plurality of purlins 18 are affixed to upper surfaces of beams 14 and positioned to extend longitudinally in parallel spaced apart relationship to substantially define the roof area. In this specific example, C-shaped purlins are illustrated for simplicity but it will be understood that purlins 18 represent the purlins to be described below. Additional purlin braces 19 can be incorporated between cantilever beams 14 for additional support if desired or deemed necessary. Some roofing material, such as solar panels or flat roof sections 20 are attached to the upper surface of purlins 18 to form a complete roof. One example of roofing material or flat sections that can be used for sections 20 is provided in United States patent entitled "Solar Support Structure", bearing U.S. Pat. No. 8,511,007, issued on Aug. 20, 2013, and incorporated herein by reference. It will be understood that structure 10 is used simply as an example of a flat roof structure and many alterations and changes may be incorporated for specific applications.

For purposes of this disclosure it should be understood that structure 10 is chiefly assembled at the site and it is highly desirable that each step of the assembly procedure be as simple as possible. Basically, each of the components mentioned above (i.e. column 12, beams 14, purlins 18, and roof sections 20) are provided as individual items from a factory/shop and assembled on site into structure 10. By providing the items separately each item can be relatively easily handled by workmen conveying the items to the site and by workmen doing the assembling at the site. Briefly, the assembly procedure includes fixing a lower end 22 of each column 12 in the ground or in a base that serves as the ground. One end of a cantilever beam 14 is affixed to the upper end 16 of each column 12 by structure that is described in more detail in a United States patent entitled "Flat Roof Support Structure", bearing U.S. Pat. No. 8,646,230, issued on Feb. 11, 2014 and incorporated herein by reference.

With beams 14 fixedly attached, purlins 18 are attached to the upper surface of beams 14 in a direction perpendicular to beam 14. Further, as can be seen from FIG. 1, purlins 18 are spaced apart a distance sufficient to allow roof sections 20 to be placed between beams 14 with opposed edges of roof sections 20 supported by adjacent beams 14. Here it will be understood that any substantial variation in the position or spacing of purlins 18 will result in the inability to properly mount roof sections 20. To overcome this problem and the problem of holding the purlin in position while fixedly attaching it to the beams, the new and novel purlins of this invention, which are designated 18 for convenience, are provided.

Figure 2:
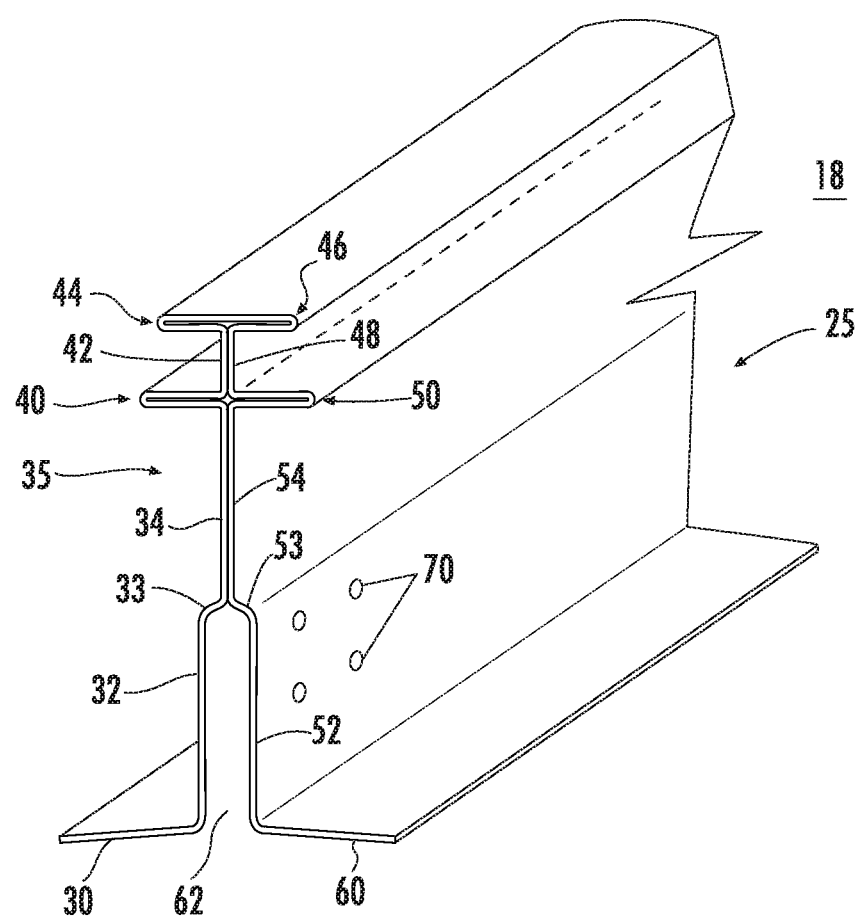
FIG. 2 is a partial longitudinal perspective view of an improved purlin used in the structure of FIG. 1, in accordance with the present invention.
Figure 3:
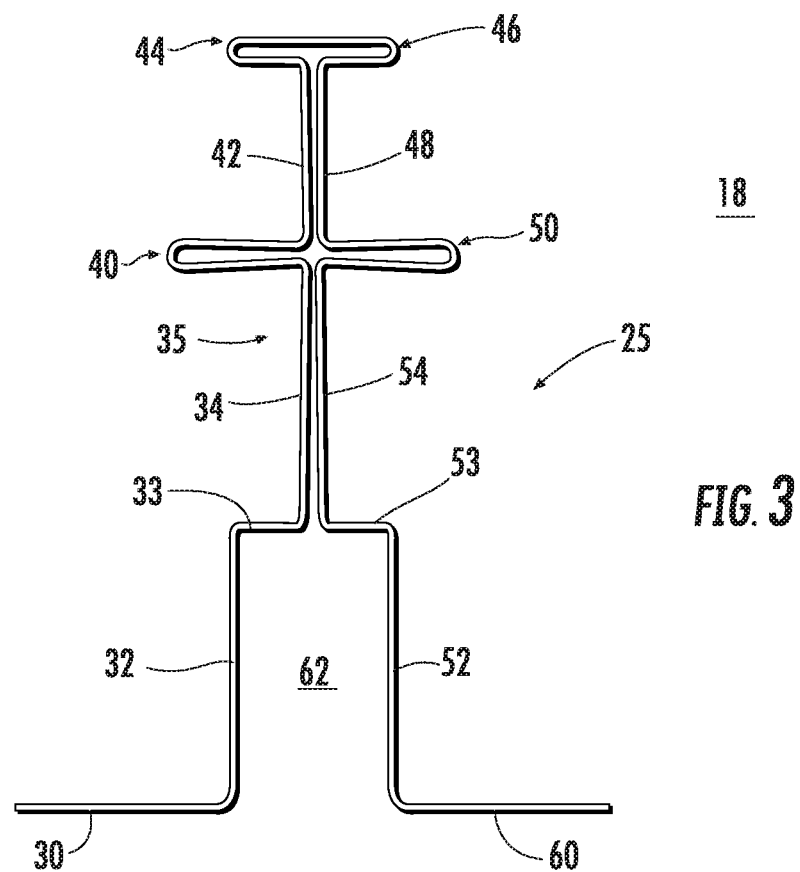
FIG. 3 is an enlarged end view of the improved purlin illustrated in FIG. 2.

Referring specifically to FIGS. 2 and 3, purlin 18 is formed from a single strip of sheet metal (designated 25) bent into the formation illustrated. While several separate components could be formed and combined into one purlin in specific circumstances, a single strip of sheet metal is preferred for simplicity and strength. Purlin 18 includes a first flat horizontal mounting portion 30. Strip 25 is bent upwardly from one edge of portion 30 into a first section 32 of an upright wall generally designated 35. Strip 25 is then bent a short distance inwardly, generally horizontal and away from the direction of portion 30 to form a jog 33 in upright wall 35. Jog 33 may be perpendicular to section 32 or at some convenient angle less than ninety degrees (depending upon bending procedures, bending machinery, etc.) and all such angles are included in the term "jog' for this application. Strip 25 is then bent upwardly again to form another section 34 of upright wall 35. For purposes of this disclosure at least section 32, jog, 33 and section 34 form a first upright wall 35 portion.

At the upper end of section 34, strip 25 is bent outwardly parallel to and in an overlying position with mounting portion 30 to define and position a first purlin mounting shelf 40. Strip 25 is bent back upon itself (substantially 360 degrees) and then bent upward again parallel and in a plane with section 34, to complete first purlin mounting shelf 40. Strip 25 continues upwardly in a section 42, which extends a distance slightly greater than the width of a roof section 20.

At an upper end of section 42, strip 25 is bent outwardly parallel to and in a spaced apart overlying position with mounting shelf 40 to define a first purlin holding flange 44. Strip 25 is bent back upon itself (substantially 360 degrees) to complete first purlin holding flange 44. Strip 25 continues horizontally over the upper end of upright wall 35 (i.e. through the plane of upright wall 35) and extends outwardly on the opposite side a distance approximately the same as the length of holding flange 44. Strip 25 is bent back upon itself (substantially 360 degrees) to complete a second purlin holding flange 44. Strip 25 is then bent downwardly parallel to and in abutting engagement with section 42 to form a section 48 with a length equal to section 42. Sections 42 and 48 form an upright portion and may be considered as a third portion of upright wall 35. Also, flanges 44 and 46 form a T-shape with sections 42 and 48 at what can be considered the upper end of upright wall 35.

At the lower end of section 48, strip 25 is bent outwardly parallel to and in an opposed direction with first purlin mounting shelf 40 to define and position a second purlin mounting shelf 50. Strip 25 is bent back upon itself (substantially 360 degrees) and then bent downward again parallel and in abutting engagement with section 34, to complete second purlin mounting shelf 50. Strip 25 continues downwardly in a section 54, which extends a distance equal to the length of section 34 and is in parallel abutting engagement with section 34 to complete the intermediate portion of upright wall 35.

Strip 25 is then bent a short distance outwardly, in a generally opposed direction to jog 33 to form a jog 53 in upright wall 35. Jog 53 may be perpendicular to section 54 or at some convenient angle less than ninety degrees (depending upon bending procedures, bending machinery, etc.) and all such angles are included in the term "jog" for this application. Preferably the angle of jog 53 is approximately equal to the angle of jog 33. Strip 25 is then bent downwardly again to form another section 52 of upright wall 35. For purposes of this disclosure at least section 52, jog 53 and section 54 form a second upright wall portion. Further, for purposes of this disclosure the first upright wall portion and the second upright wall portion form complete upright wall 35 (sections 42 and 48 may also be included).

Purlin 18 includes a second flat horizontal mounting portion 60 formed by bending strip 25 outwardly from the lower end of section 52 in a direction opposed to and in a plane with first flat horizontal mounting portion 30 and with approximately an equal width. Portions 30 and 60 cooperate to form a flat mounting wall for mounting purlin 18 on a series of spaced apart roof beams as illustrated in FIG. 1. Also, section 32 and 52, along with jogs 33 and 53, cooperate to define an elongated channel 62 that extends the length of purlin 18 and, as will be explained further, serves to mount purlin 18 on roof beams 14.

It will be understood that strip 25 of sheet metal has a length equal to the desired length of purlin 18 and all of the bends, sections, etc. described above extend for the entire length of the purlin. In the preferred embodiment purlin 18 is manufactured from any convenient metal such as aluminum, sheet steel, etc. Generally, purlin 18 can be fabricated from any convenient metal material, such as a relatively heavy gauge sheet metal (e.g. 16 gauge to 25 gauge) with the specific metal (e.g. aluminum, sheet steel, etc.) selected for any specific roof application. Further, since purlin 18 is preferably formed as a single integral unit for the entire length, at least one method of manufacture includes extruding in a well-known operation.

Figure 4:
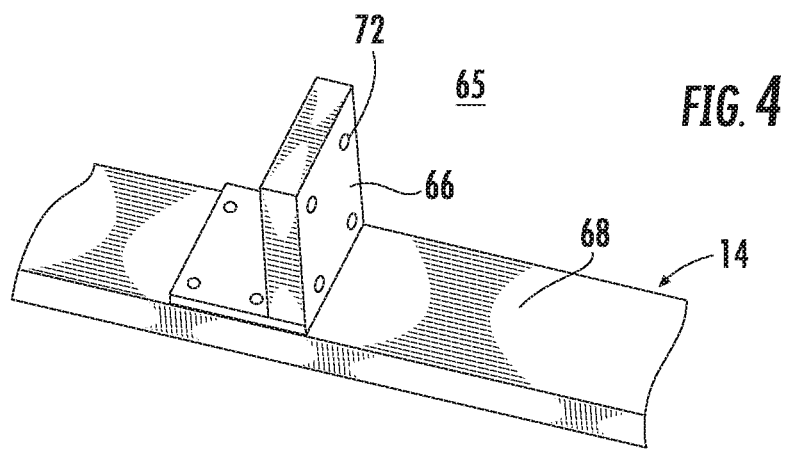
FIG. 4 is a perspective view of a positioning and mounting device for the purlin of FIG. 2, in accordance with the present invention.

Turning now to FIG. 4 a positioning and mounting device 65 for purlin 18 is illustrated. Positioning and mounting device 65 includes at least a vertically extending support wall 66 that is relatively easily attached to an upper surface 68 of a roof beam 14, such as the beams 14 illustrated in FIG. 1. In this preferred embodiment device 65 is a short section of angle bar with a length approximately the same as the width of beam 14. As understood in the art, the term "angle bar" encompasses any angular material, such as aluminum, steel, iron, etc. Also, while it is most convenient and efficient to simply cut sections from commercially available angle bar, it will be understood that the mounting of vertically extending support wall 66 is the goal and any structure that serves this purpose is acceptable. As will be understood, positioning and mounting device 65 can be specially formed from sheet metal or the like and can incorporate any structure for fixedly attaching it to a beam 14 so that a vertically extending support wall is provided.

Vertically extending support wall 66 is specifically selected to nest firmly within channel 62 defined by purlin 18 and, preferably has a vertical height approximately equal to the vertical length of channel 62 so as to provide the maximum support and vertical guidance. In this preferred embodiment, a plurality of positioning and mounting devices 65 are fixedly attached to upper surface 68 of beams 14 in the factory/shop so they can be accurately mounted in the exact spaced apart orientation. Also in this preferred embodiment purlin 18 is attached to vertically extending support wall 66 of each positioning and mounting device 65 by means of bolts extending through holes 70 through sections 32 and 52 of purlin 18 and holes 72 through vertically extending support wall 66. Once beams 14 are positioned and attached in structure 10 (or some similar structure) purlins are simply engaged over rows of vertically extending support walls 66 and fixed in place. Thus, purlins 18 are exactly positioned in the desired spaced apart orientation and are fixedly engaged to beams 14 without the requirement of any special tools and with a minimum of labor.

One added feature of the present invention is the optional inclusion of ceiling sections in the roof structure. In some instances as for example where the roof structure is used in the construction of a garage or the like, it may be desirable to cover wiring and the underside of the roof structure with ceiling sections. In such applications ceiling sections preferably about the same size as roof sections 20 can be provided (see roof sections 20 in FIG. 1). In such applications the total distance between the upper surface of first flat horizontal mounting portion 30 and the under surface of first purlin mounting shelf 40, for example, can be slightly greater than the thickness of the ceiling sections. The ceiling sections are conveniently mounted by simply sliding them into the opening defined above each of the first and second flat horizontal mounting portions 30 and 60, respectively.

Figure 5:
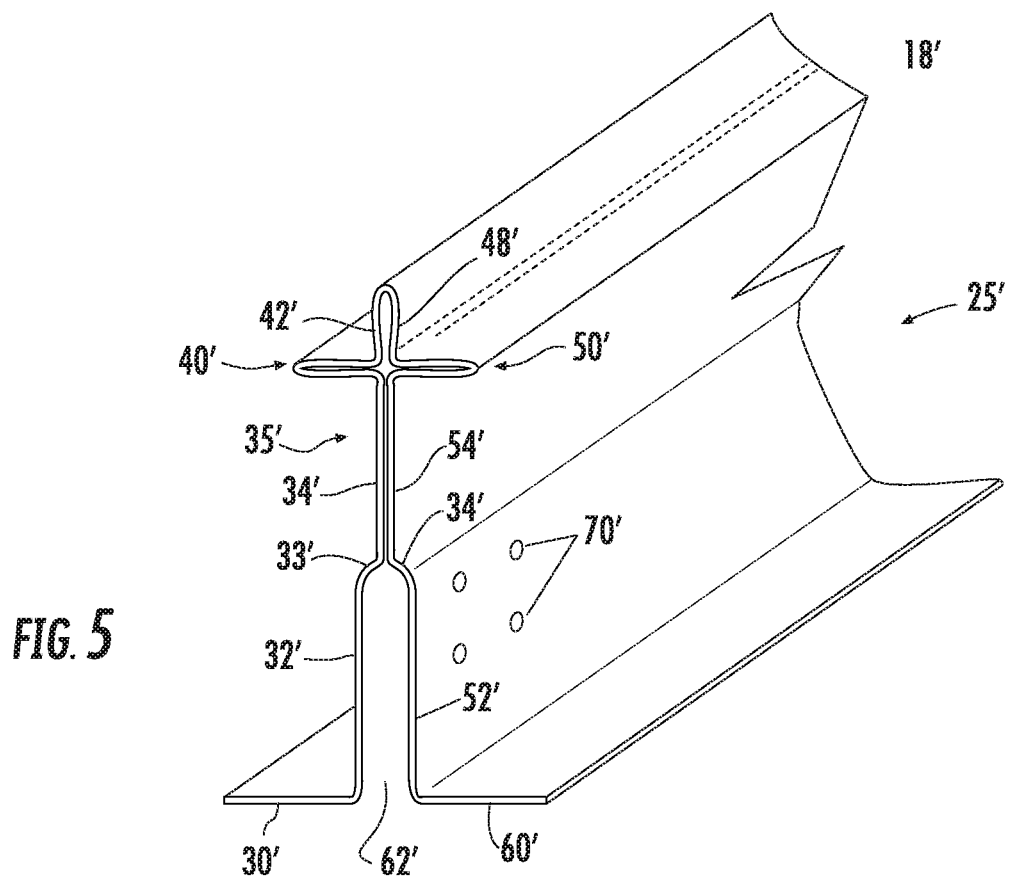
FIG. 5 is an end view of another example of an improved purlin used in the structure of FIG. 1, in accordance with the present invention.

Turning now to FIG. 5, another example of a purlin 18' for use in a roof structure 10 in accordance with the present invention is illustrated. Components of purlin 18' that are similar to purlin 18 are designated with similar numbers and a prime (') is added to indicate the different example. In purlin 18' the difference is that flanges 44 and 46 forming a T-shape with sections 42 and 48 are eliminated or not included. In some instances it has been found that positioning roof sections 20 on purlin mounting shelves 40 and 50 is more convenient if flanges 44 and 46 are omitted. Thus, in the example of purlin 18', strip 25' is simply turned back down (approximately 360 degrees) after forming shelf 40' at an upper end to form a third portion of upright wall 35'.

In this preferred embodiment an elongated strip of sheet metal is formed into a purlin by bending it multiple times along the longitudinal axis. While the bends are described herein in a specific order for convenience in understanding, it will be understood that the various bends might be performed in any convenient order. Thus, it will be understood that the new and improved purlins for use in flat roof structures are easily positioned and mounted through the use of pre-mounted positioning and mounting devices 65. The new and improved purlins for use in flat roof structures are manufactured from any convenient metal such as aluminum, sheet steel, etc. Also, the new and improved purlins for use in flat roof structures can be easily bolted to roof beams at the site and do not require any on-site welding or any special tools. Further, the new and improved purlins for flat roof structures and the positioning and mounting devices are relatively simple and inexpensive to manufacture and install.

Various changes and modifications to the examples herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

The invention claimed is:

1. A purlin mounting system for use in a flat roof structure comprising:
   a purlin formed from a single metal strip with a plurality of longitudinal bends defining a first flat mounting wall portion, a first upright wall portion extending upwardly from an edge of the first flat mounting wall portion, a first perpendicularly outwardly extending mounting shelf attached to an upper end of the first upright wall portion, a second flat mounting wall portion, a second upright wall portion extending upwardly from an edge of the second flat mounting wall portion parallel to and in abutting engagement with the first upright wall portion, a second perpendicularly outwardly extending mounting shelf attached to an upper end of the second upright wall portion and extending in an opposed direction to the first perpendicularly outwardly extending mounting shelf, and a third upright wall portion extending from and perpendicular to the first mounting shelf and the second mounting shelf; and the first flat mounting wall portion and the second flat mounting wall portion cooperating to form a flat mounting wall for mounting the purlin on a roof beam, the first upright wall portion and the second upright wall portion being spaced apart adjacent the first flat mounting wall portion and the second flat mounting wall portion defining a vertical mounting channel extending from a lower surface of the flat mounting wall a distance less than the distance of the first and second mounting shelves from the flat mounting wall.

2. A purlin mounting system as claimed in claim 1 wherein the purlin further includes first and second flanges integrally attached to an upper end of the third upright wall portion and forming a T-shape with the upper end of the third upright wall portion.

3. A purlin mounting system as claimed in claim 2 wherein the first and second flanges are spaced from the first and second shelves, respectively, a distance greater than a thickness of roof sections.

4. A purlin mounting system as claimed in claim 1 wherein the first and second shelves are spaced from the flat mounting wall a distance greater than a thickness of ceiling sections.

5. A purlin mounting system as claimed in claim 1 and further including a purlin positioning and mounting device, the purlin positioning and mounting device including a vertically extending support wall designed to nest within the vertical mounting channel.

6. A purlin mounting system as claimed in claim 5 wherein the purlin positioning and mounting device includes a section of angle bar, one leg of the angle bar defining the vertically extending support wall and one leg positioned on an upper surface of the supporting roof beam.

7. A purlin mounting system as claimed in claim 6 wherein the section of angle bar has a length approximately equal to the horizontal width of the supporting roof beam, the vertically extending support wall being further designed to be oriented perpendicular to an axial length of the supporting roof beam.

8. A method of fabricating a purlin for use in a flat roof structure comprising the steps of:
providing an elongated strip of sheet metal;
forming the strip into a purlin by bending the strip along a longitudinal direction into a plurality of integral longitudinal elements including a first flat mounting wall portion, a first upright wall portion extending upwardly from an edge of the first flat mounting wall portion, a first perpendicularly outwardly extending mounting shelf attached to an upper end of the first upright wall portion, a second flat mounting wall portion, a second upright wall portion extending upwardly from an edge of the second flat mounting wall portion parallel to and in abutting engagement with the first upright wall portion, a second perpendicularly outwardly extending mounting shelf attached to an upper end of the second upright wall portion and extending in an opposed direction to the first perpendicularly outwardly extending mounting shelf, and a third upright wall portion extending from and perpendicular to the first mounting shelf and the second mounting shelf;

the steps of forming the first flat mounting wall portion and the second flat mounting wall portion including positioning the first flat mounting wall portion and the second flat mounting wall portion to form a flat mounting wall for mounting the purlin on a roof beam; and the steps of forming the first upright wall portion and the second upright wall portion including spacing the first upright wall portion and the second upright wall portion apart adjacent the first flat mounting wall portion and the second flat mounting wall portion to define a vertical mounting channel extending from a lower surface of the flat mounting wall a distance less than the distance of the first and second mounting shelves from the flat mounting wall.

9. A method as claimed in claim 8 wherein the step of forming the strip into a purlin further includes forming first and second flanges integrally attached to an upper end of the third upright wall portion and forming a T-shape with the upper end of the third upright wall portion.

10. A method as claimed in claim 9 wherein the step of forming the first and second flanges includes spacing the first and second flanges from the first and second shelves, respectively, a distance greater than a thickness of roof sections.

11. A method as claimed in claim 8 wherein the step of forming the first and second shelves includes spacing the first and second shelves from the flat mounting wall a distance greater than a thickness of ceiling sections.

12. A method as claimed in claim 8 further including a step of forming a purlin positioning and mounting device including a vertically extending support wall designed to nest within the vertical mounting channel.

13. A method as claimed in claim 12 wherein the step of forming a purlin positioning and mounting device includes providing a section of angle bar, one leg of the angle bar defining the vertically extending support wall and one leg positioned on an upper surface of a supporting roof beam.

14. A method as claimed in claim 13 wherein the step of providing the section of angle bar includes forming the angle bar with a length approximately equal to the horizontal width of the supporting roof beam, the vertically extending support wall being further designed to be oriented perpendicular to an axial length of the supporting roof beam.

* * * * *